G. E. BALLANTYNE.
TRACTION DEVICE FOR MOTOR VEHICLES.
APPLICATION FILED MAR. 19, 1919.
1,331,839.                               Patented Feb. 24, 1920.
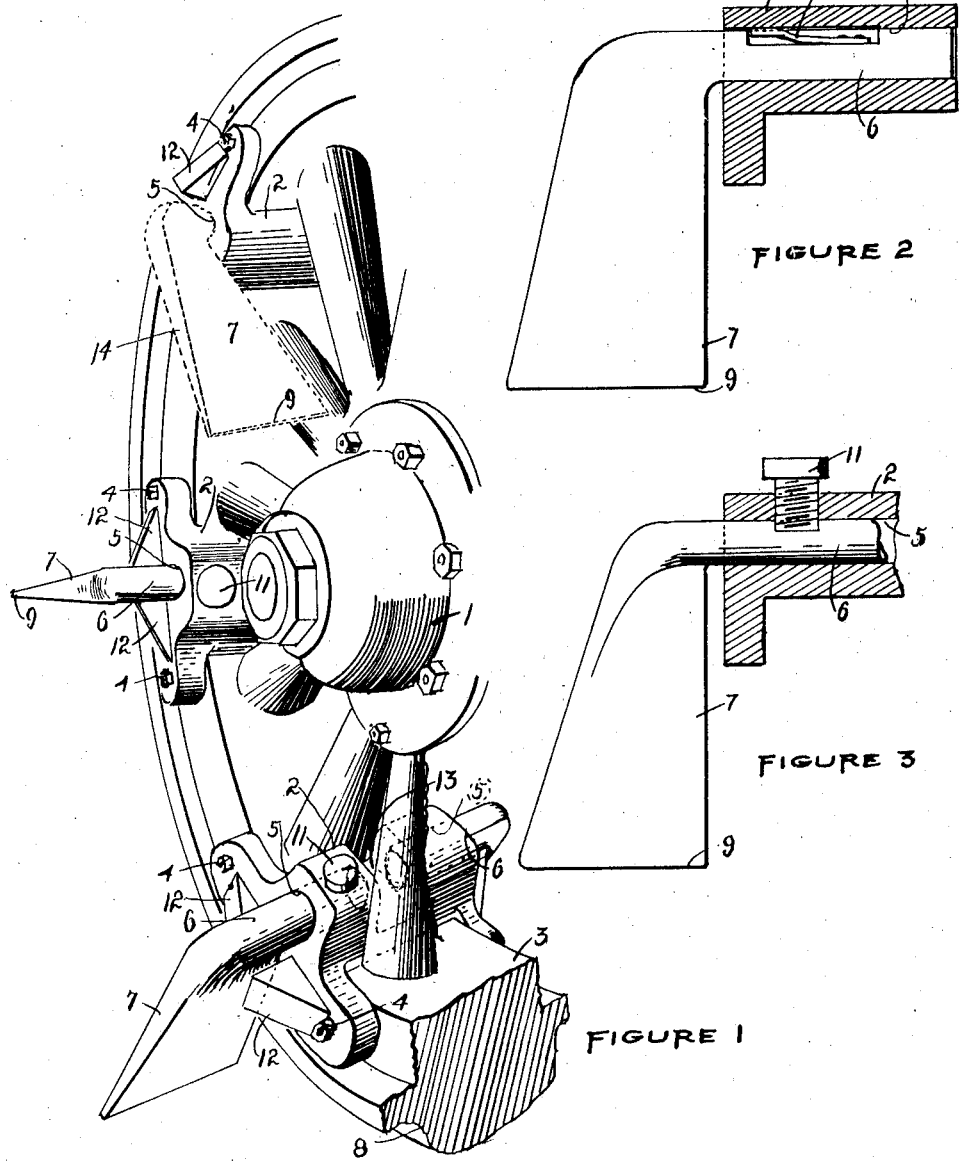
INVENTOR
George E. Ballantyne
By John A. Naismith
HIS ATTORNEY

UNITED STATES PATENT OFFICE.

GEORGE E. BALLANTYNE, OF SAN JOSE, CALIFORNIA.

TRACTION DEVICE FOR MOTOR-VEHICLES.

1,331,839.  Specification of Letters Patent.  Patented Feb. 24, 1920.

Application filed March 19, 1919. Serial No. 283,602.

*To all whom it may concern:*

Be it known that I, GEORGE E. BALLANTYNE, a citizen of the United States, and a resident of San Jose, in the county of Santa Clara and State of California, have invented certain new and useful Improvements in Traction Devices for Motor - Vehicles, of which the following is a specification.

My invention relates to a form of traction device to be used on the drive wheels of motor vehicles to assist in securing the necessary grip when operating upon soft ground.

The object of my invention is to provide a traction device of the character indicated that will be simple in form, economical to manufacture, easily adapted for use on any type of vehicle wheel, quickly and easily positioned upon a wheel or removed therefrom, and highly efficient for the purpose indicated.

Other objects will appear in the following description and in the drawing, in which,—

Figure 1 is a perspective view of a portion of a vehicle wheel having one form of my invention in position thereon.

Fig. 2 is a side elevation of one of my devices showing one method of holding the same in its socket, the socket portion being in section.

Fig. 3 is a side elevation of one of the devices showing another method of holding the same in its socket, the socket portion being in section.

In the drawing, 1 indicates a portion of a vehicle wheel having a bar 2 suitably formed and secured to felly 3 by bolts 4. In each end of bar 2 is formed a socket 5. In each socket 5 is fitted a shaft 6 carrying a blade 7, the said blade 7 extending at right angles to shaft 6 to a distance beyond the edge of tire 8. At the juncture of blade 7 with shaft 6 the same is made thick and strong and gradually tapers to a broad flat surface and a comparatively thin edge 9.

In use the bar 2 is fastened securely in position, preferably as an integral part of the wheel 1, and the blades are carried in the tool box of the vehicle. If the machine is endeavoring to pull out of soft ground such as is commonly encountered in a plowed orchard during the rainy season, then the several blades are positioned on the wheel as shown in solid lines in Fig. 1, by simply inserting the shaft in its respective socket, where it is held in any suitable manner as by a heavy spring 10 or a set screw 11. If a round shaft 6 is used then a stop 12 should be placed on each side of blade 7, but if a square shaft is used sufficient rigidity is secured without the use of the stops.

In order that any accumulation of mud or dirt in the several sockets 5 may offer no resistance to the insertion of the several shafts, I have shown an opening 13 in the center of bar 2 into which said sockets open, and into which accumulated mud or dirt may be forced. In the embodiment shown in Fig. 2 the bar 2 is made the full width of felly 3 for use with a single blade, the socket 5 extending clear through bar 2.

In the case of a short haul the blades need not be removed and stored away until again required, but merely turned back toward the center of the wheel as indicated in dotted lines at 14.

As many blades may be attached to a wheel as circumstances may require, each blade 7 presenting a broad flat surface extending a distance beyond the edge of the wheel rim at a suitable angle to the plane of the wheel that effectually prevents the wheel from churning in the mud.

While I have shown and described but one preferred form of the device as applied to a spoked wheel, it is understood that changes in form, construction, and method of application which will permit its adaptation for use on any other form of vehicle wheel may be made within the scope of the appended claim. I desire to cover broadly the positioning of a fixed socket on a wheel body and the positioning of a radially extending blade therein, or a blade extending radially beyond the wheel rim and secured in any suitable manner to the side of the wheel body.

I claim:

The combination with a wheel of a blade provided with a wide mud-engaging surface having its greatest width and least thickness at its mud-engaging end and increased thickness and reduced width at its opposite end, said latter end having a shaft formed integrally therewith, extending a distance at right angles thereto and lying in the plane in which said blade lies, a member rigidly mounted upon said wheel near the periphery thereof and provided with a transversely extending socket of substantially the same length as said shaft and adapted to receive the same, means for locking said shaft against longitudinal movement in said socket, and means for locking said blade in a radial position with relation to said wheel when in an operative position.

Executed this 8th day of March, 1919.

GEORGE E. BALLANTYNE.